United States Patent [19]

Hara

[11] Patent Number: 5,019,146

[45] Date of Patent: May 28, 1991

[54] METHOD FOR PRODUCING GLASS

[75] Inventor: Koichi Hara, Ome, Japan

[73] Assignee: Hoya Corporation, Tokyo, Japan

[21] Appl. No.: 511,423

[22] Filed: Apr. 23, 1990

[30] Foreign Application Priority Data

Apr. 28, 1989 [JP] Japan ............................ 1-111496

[51] Int. Cl.$^5$ .............................................. C03B 19/06
[52] U.S. Cl. ........................................ 65/18.1; 65/901; 423/338; 501/12
[58] Field of Search ................... 65/17, 18.1, 901; 501/12; 423/338

[56] References Cited

U.S. PATENT DOCUMENTS

| 4,278,632 | 7/1981 | Yoldas | 65/901 |
|---|---|---|---|
| 4,397,666 | 8/1983 | Mishima et al. | 65/18.1 X |
| 4,605,428 | 8/1986 | Johnson et al. | 65/18.1 X |
| 4,680,049 | 7/1987 | Onorato et al. | 65/18.1 |
| 4,801,318 | 1/1989 | Toki et al. | 65/18.1 |

Primary Examiner—Robert L. Lindsay
Attorney, Agent, or Firm—Nixon & Vanderhye

[57] ABSTRACT

A method for producing a uniform glass of a large size without forming bubbles and holes at the bottom thereof is provided. This method comprises concentrating a sol solution obtained by hydrolysis of a metal alkoxide such as alkoxide of silicon in the presence of an organic solvent and ammonia water until a volume of the sol solution reaches 1.00–1.95 times the volume of the charged metal alkoxide, then gelling the concentrated sol solution with addition of a mixed solution of an aqueous catalyst solution and an organic solvent, then drying the gel and heating the dry gel to sinter it.

12 Claims, No Drawings

METHOD FOR PRODUCING GLASS

BACKGROUND OF THE INVENTION

The present invention relates to a method for production of glass and in particular to a method according to which a uniform glass of a large size can be efficiently produced by a sol-gel method without using complicated operations.

For the production of glass, there is a sol-gel method which uses a metal alkoxide. It has been considered difficult to produce a glass of a large size bY this sol-gel method. This is because according to the sol-gel method, fracture often occurs in a dry gel obtained by drying treatment after gelation.

On the other hand, Japanese Patent Kokai [Laid-Open] No. Sho 60-131833 discloses a sol-gel method for producing a glass of a large size which has never been produced by the conventional sol-gel method. However, as is seen from Examples mentioned in the specification thereof, according to this method, and acid such as hydrochloric acid is added to a metal alkoxide such as silicon ethoxide and the mixture is vigorously stirred, then ultrafine silica is added thereto with stirring end then is subjected to ultrasonic vibration, thereafter the resulting clusters are removed by centrifugation, then pH is adjusted with a basic catalyst, followed by gelation, drying and sintering. Thus, not only the steps are complicated, but also the clusters are still present even after ultrasonic treatment and this must be removed by centrifugation.

According to the method disclosed in the above Japanese Patent Kokai (Laid-Open) No. Sho 60-131833, a glass of a relatively large size can be produced by a sol-gel method, but it suffers from the problems of very complicated steps such as addition of ultrafine silica, ultrasonic vibration treatment and centrifugal treatment.

Under the circumstances, the inventor has disclosed in Japanese Patent Application No. Sho 63-32635 that it is possible to efficiently produce a glass of a large size without using complicated operation by a glass producing method characterized in that a sol solution obtained by hydrolyzing a metal alkoxide in the presence of an organic solvent and ammonia water is concentrated until its volume reaches 1.00-1.95 times the volume of the charged metal alkoxide and then the concentrated sol solution is gelled with addition of an aqueous solution of an acid catalyst, then dried and thereafter sintered by heating to obtain the desired glass.

However, the above method of Japanese Patent Application No. Sho 63-32635 suffers from the problems that it is difficult to uniformlY dispersing the acid catalyst in the sol solution, when the aqueous solution of the acid catalyst is added to the concentrated sol solution, because of poor affinity between the sol solution and the aqueous solution of the acid catalyst, and thus sOlids of about 1 mm in diameter are produced in the sol solution to which the aqueous solution of the acid catalyst has been added and bubbles or holes of about 0.5 mm in diameter are apt to be formed in the bottom portion of the finally obtained glass.

SUMMARY OF THE INVENTION

The object of the present invention is to provide a method by which a uniform glass of a large size can be efficiently produced by a sol-gel method without using complicated operation, while preventing the formation of the bubbles and holes in the bottom portion of the glass.

According to the present invention, there has been solved the problem observed in the glass production method disclosed in Japanese Patent Application No. Sho 63-32635, by improving the affinity between a concentrated sol solution and a catalyst by using a mixed solution in which an organic solvent is added to an aqueous catalyst solution.

The method for producing glass of the present invention comprises hydrolyzing a metal alkoxide in the presence of an organic solvent and ammonia water to obtain a sol solution, concentrating the sol solution until its volume reaches 1.00-1.95 times the volume of the metal alkoxide, then adding a mixed sOlution of an aqueous catalyst solution and an organic solvent to the sol solution to gel it, then drying the resulting gel and thereafter heating and sintering the dry gel to obtain the desired glass.

DETAILED DESCRIPTION OF THE INVENTION

As the metal alkoxide used in the method of the present invention, an alkoxide of silicon is especially preferred, because silica glass can be obtained by using alkoxide of silicon. As examples of alkoxides of silicon, mention may be made of tetraalkoxysilanes such as tetramethoxysilane, tetraethoxysilane, tetra-n-propoxysilane, tetra-i-propoxysilane, tetra-n-butoxysilane, tetra-sec-butoxysilane, and tetra-tert-butoxysilane, these tetraalkoxysilanes in which 1-3 alkoxy group(s) are substituted wIth 1-3 alkyl group(s). such as monoalkyltrialkoxYsilanes. dialkyldialkoxysilanes, and trialkylmonoalkoxysilanes, and partial hVdrolVzates of these alkoxides of silicon.

As the metal alkoxide, alkoxide of aluminum may also be used. As examples thereof, mention may be made of trialkoxyaluminums such as trimethoxyaluminum, triethoxyaluminum, tri-n-propoxyaluminum, tri-i-propoxyaluminum and tri-n-butoxyaluminum, these trialkoxyaluminums in which 1 or 2 alkoxy group(s) are substituted with 1 or 2 alkyl group(s), such as monoalkyldialkoxyaluminums and dialkylmonoalkoxyaluminums, and partial hydrolyzates of these alkoxides of aluminum. Furthermore, there may also be used alkoxides of titanium such as ,, tetrabutoxytitanium, alkoxides of zirconium such as tetraethoxyzirconium and partial hydrolyzated of these alkoxides.

Two or more of these metal alkoxides comprising same or different metals may also be used.

In the method of the present invention, the above metal alkoxide is hydrolyzed in the presence of an organic solvent and ammonia water. As the organic solvent used in this hydrolysis step, there maY be used alcohols such as methanol, ethanol, propanol and butanol, ethers such as propyl ether, ketones such as acetone and propyl ketone, and esters such as methyl formate, ethyl formate, methyl acetate and ethyl acetate.

A ratio of metal alkoxide, organic solvent and ammonia water used in the method of the present invention may vary depending on kind of the organic solvent, but when, for example, an alcohol is used as orgánic solvent, the ratio of metal alkoxide, alcohol and ammonia water is 1:2–60:2–60 and an ammonia concentration in the ammonia water is preferably 0.0001–1 mol/1. It is especially preferred that the ratio is 1:3–20:2.5–10 and ±he ammonia concentration is 0.0005–0.1 mol/1.

In the method of the present invention, it is also possible to add a metal salt, which is able to convert to a metal oxide and constitute a part of glass in the course of production of glass by a sol-gel method, as an optional component together with the above essential components.

Typical examples of the metal salt include nitrates represented by the formula:

$$M(NO_3)_m \qquad (I)$$

(wherein M denotes a metal and m denotes a coordination number of metal M) and carboxylates represented by the formula:

$$M[C_nH_{2n+1}COO]_m \qquad (II)$$

(wherein M denotes a metal, m denotes a coordination number of metal M and n denotes an integer of 1-6).

M which is a metal component in the above formulas (I) and (II) is preferably a metallic element of from the second period to the sixth period of Groups Ia, IIa, IIIb, IVb, Vb, VIb, VIIb, VIII, Ib, IIb, IIIa, IVa and Va of the periodic table. Examples thereof are Al, Ba, Be, Bi, Cd, Ca, Ce, Cs, Cr, Co, Cu, Dy, Er, Eu, Gd, Ga, Au, In, Ir, Fe, La, Pb, Li, Mg, Mn, Hg, Nd, Ni, Pd, K, Pr, Ra, Rh, Rb, Sm, Sc, Ag, Na, Sr, TI, Th, Sn, U, Yb, Y, Zn, Zr, and Tb.

Furthermore, $[C_nH_{2n+1}COO]$ which is a carboxylic acid residue in the formula (II) is preferably acetic acid residue [$CH_3COO$], propionic acid residue [$C_2H_5COO$] or butyric acid residue [$C_3H_7COO$], namely, n is 1-3. In the cburse of production of a glass by a sol-gel method, the nitrate of the formula (I) decomposes to generate gases such as $NO_2$ and the carboxylate Of the fOrmula (II) decomposes to generate gases such as $H_2O$ and $CO_2$ to convert to a metal oxide end constitute a part of the glass produced, respectively.

Metal chlorides and metal fluorides maY also be used as the metal salt which is an optional component.

These metal salts are preferably soluble in a mixed solution containing metal alkoxide, organic solvent and ammonia water for obtaining a homogeneous glass.

The hydrolysis step in the method of the present invention is preferably carried out at a temperature of from room temperature to boiling point of the organic solvent, and usually a temperature of from room temperature to about 80° C. A time for the hydrolysis can be optionallY chosen within the range of 0 hour to 30 daYs. The hydrolysis time of 0 hour means that a time of hydrolysis is not especially provided and hydrolysis may be carried out in the subsequent concentration step. Since the hydrolysis can also be partially carried out in the concentration step, even when the hYdrolYsis step is provided, the time of hydrolysis is preferably as short as possible.

Then, the sol solution obtained by the hydrolysis is concentrated. This concentration step must be carried out until the volume of the sol solution reaches 1.00-1.95 times the volume of the charged metal alkoxide, and a glass of a large size can be finally obtained by carrying out the concentration within this range. If the concentration ratio of sol solution in the concentration step is less than 1.00 times the volume of the charged metal alkoxide, when a mixed solution of a catalyst and an organic solvent is added for gelling of the sol solution, many large particles are produced in the sol solution and the viscosity of the sol solution increases to cause the retention of bubbles in a gel formed. If the concentration ratio exceeds 1.95 times, cracks are apt to occur in a dry gel while producing it and a glass of a large size cannot be obtained.

As means for the concentration of a sol solution, there may be used those methods which use a natural convection type furnace (oven) or a hot air circulating type blowing furnace (oven) as well as conventionally employed concentration methods such as under-vacuum-heating concentration methods which use a rotary evaporator or the like and concentration methods which use a ultrafiltration membrane. Especially, ovens such as the ho& air circulating tYpe blowing oven which are provided with blowing means which can supply air above the surface of the sol solution have the advantages that (I) they can perform the concentration in a shorter time than the natural convection type ovens;(2) they are simpler and cheaper than the concentration methods which use ultrafiltration membrane; and (3) they do not damage the stability of the sol solution than the concentration methods which use a rotary evaporator and the like and they hardly cause the adhering of gel to the apparatus. Thus, such concentration methods using the hot air circulating type blowing oven is preferred in practical use.

In this concentration operation, temperature of the sol solution is preferably within the range of from room temperature to a boiling point of an organic solvent.

As mentioned above, a glass of a large size can be obtained by employing the concentration ratio of 1.00-1.95 times, but when an aqueous solution of an acid catalyst is added to a concentrated sol solution, there occurs the problem of formation of bubbles or holes due to insufficient affinity between them. Therefore, according to the method of the present invention, the gelation of the concentrated sol solution is carried out by adding an aqueous solution of acid catalyst and an organic solvent to the concentrated sol solution in order to improve affinity between the catalyst which is a yelling agent and the sol solution.

The aqueous catalyst solution used includes aqueous solutions of acid catalyst such as aqueous solution of hydrofluoric acid and aqueous solution of hydrosilicofluoric acid and aqueous solutions of alkali catalyst such as ammonia water. The concentration of the catalyst in the aqueous solution is preferably 1-15%.

As the organic solvents added to the above-mentioned aqueous catalyst solution, men&ion may be made of, for example, alcohols such as methanol, ethanol, propanol and butanol, ethers such as propyl ether, ketones such as acetone and propyl ketone and esters such as methYl formate, ethyl formate, methyl acetate and ethYl acetate.

The mixing ratio of the aqueous catalyst solution and the organic solvent is such that the Organic solvent is preferably 0.1-3.0 ml, especially 0.15-1.5 ml per 1 ml of the aqueous catalyst solution. If the amount of the organic solvent to 1 ml of the aqueous catalyst solution is less than 0.1 ml, affinity between the sol solution and the catalyst is insufficient and thus it is difficult to uniformly disperse the catalyst in the sol solution, and solids of about 1 mm in diameter are produced in the sol solution after addition of mixed solution to cause the formation of bubbles or holes of about 0.5 mm in diameter in the bottom portion of a glass finally obtained. On the other hand, even when the organic solvent is mixed in an amount of more than 3.0 ml per 1 ml of the aqueous catalyst solution, the effect to inhibit the formation of bubbles or holes in the bottom portion of the final glass cannot be enhanced and besides, the addition of the organic solvent in a large amount to the concentrated solution in the gelation step spoils the meaning that the sol solution has been concentrated in the preceding concentration step.

The amount of the mixed solution of an aqueous catalyst solution and an organic solvent added to the concentrated sol solution is preferably 3-25 ml per 100 ml of the concentrated sol solution. If the amount of the mixed solution is less than 3 ml, the concentration of the catalyst must be high and the homogeneous mixing cannot be attained. If the amount of the mixed solution is more than 25 ml, the content of metal component(s) contained in the gel is extremely reduced.

Gelation of the sol solution is carried out in a mold having a given shape depending on the shape of the desired glass, for example, a rectangular mold or columnar mold.

Drying is carried out by introducing a gel into a mold having a lid with small holes and keeping it at a temperature of from room temperature to 80° C. When room temperature is employed, it is preferred that drying is carried out for 15-60 days using a mold with a lid having a hole area ratio of 0.2-2.0%. When 60° C is employed for drying, it is preferred that a hole area ratio of the lid of the mold is 0.1-8% and drying is carried out for 6-15 days.

Heating to a temperature to higher than 80° C should be avoided because cracks occur in a dry gel even if any hole area ratio of the lid is chosen.

Sintering of dry gel is carried out at a temperature of from 1150° C to a softening temperature or below and the desired glass is obtained by this sintering.

The following nonlimiting examples will further explain the invention.

EXAMPLE 1

Four liters of tetraethoxysilane (metal alkoxide), 4.8 liters of ethanol (organic solvent) and 1.2 liter of 0.0009 mol/l ammonia water were mixed to obtain a mixed solution of totally 10 liters. This mixed solution was kept at 65° C for 8 days in a container with a lid to hydrolyze tetraethoxysilane to obtain a sol solution. Then, the resulting sol solution was charged in a columnar container of 20 cm in diameter and 35 cm in height and having an upper lid with a hole of 10 cm in diameter. Then, this container was left to stand for 30 hours in a hot air (65° C) circulation type blowing furnace to concentrate the sol solution to 6.5 liters (1.63 times the volume of the charged tetraethoxysilane).

Then 2.5 liters of the resulting concentrated solution was mixed with a mixed solution of 0.2 liter of 5% aqueous hydrosilicofluoric acid solution and 0.2 liter of ethanol, and the mixture was charged in a rectangular mold of 35 cm square and kept at room temperature for about 30 minutes to gel the solution.

Then, the resulting gel was dried by leaving the gel in the same rectangular mold as above with 0.8% in a hole area ratio of the upper lid for 40 days at room temperature. The resulting dry gel had no cracks.

Next, the resulting dry gel was heated from room temperature to 1200° C over a period of 50 hours and kept at 1200° C for 2 hours to obtain a rectangular transparent glass in a large size of 150×150×7 mm, without forming bubbles and holes at the bottom of the glass.

The resulting glass had a specific gravity, a thermal expansion coefficient, a Vickers hardness, an infrared spectrum and a refractive index which are similar to those of conventional silica glass.

EXAMPLE 2

Example 1 was repeated except that 2.5 liters of the concentrated solution obtained as in Example 1 was mixed with a mixed solution of 0.2 liter of 5% aqueous hydrosilicofluoric acid solution and 0.2 liter of methanol to obtain a rectangular transparent glass in a large size of 150×150×7 mm, without formation of bubbles and holes at the bottom of the glass.

The resulting glass had a specific gravity, a thermal expansion coefficient, a Vickers hardness, an infrared spectrum and a refractive index which are similar to those of conventional silica glass.

EXAMPLE 3

Example 1 was repeated except that 2.5 liters of the concentrated solution obtained as in Example 1 gas mixed with e mixed solution of 0.2 liter of 5% aqueous hydrosilicofluoric acid solution and 0.i liter of ethanol to obtain a rectangular transparent glass in a large size of 150×150×7 mm, without formation of bubbles and holes at the bottom of the glass.

The resulting glass had a specific gravity, a thermal expansion coefficient, a Vickers hardness, an infrared spectrum and a refractive index which are similar to those of conventional silica glass.

Comparative Example 1

Example 1 was repeated except that 2.5 liters of the concentrated solution obtained as in Example I was mixed with 0.2 liter of 5% aqueous hydrosilicofluoric acid solution without using an organic solvent, to obtain a rectangular transparent glass in a large size of 150×150×7 mm. At the bottom of the glass, about 20 of bubbles and holes were per $cm_2$ were formed.

As explained above, according to the method of the present invention, a uniform glass of a large size can be efficiently obtained by a sol-gel method, without forming bubbles and holes at the bottom of the glass.

What is claimed is:

1. A method for producing a glass which comprises hydrolyzing a metal alkoxide in the presence of an organic solvent and ammonia water to obtain a sol solution, concentrating the resulting sol solution until a volume of the sol solution reaches 1.00–1.95 times the volume of the metal alkoxide, then gelling the concentrated sol solution with addition of a mixed solution of an aqueous catalyst solution and an organic solvent, drying the resulting gel and thereafter heating the dry gel to sinter it.

2. A method according to claim 1, wherein a metal-salt is used in addition to the metal alkoxide.

3. A method according to claim 1, wherein the concentration of the sol solution is carried out by heating the sol solution while feeding air above the surface of the sol solution.

4. A method according to claim 3, wherein the concentration is carried out in a hot air circulation type blowing furnace.

5. A method according to claim 1, wherein the metal alkoxide is an alkoxide of silicon, aluminum, titanium or zirconium or a partial hydrolyzate thereof.

6. A method according to claim 6, wherein the metal alkoxide is an alkoxide of silicon or a partial hydrolyzate thereof.

7. A method according to claim 2, wherein the metal salt is a nitrate or a carboxylate.

8. A method according to claim 1, wherein the aqueous catalyst solution used for gelation is an aqueous solution of hydrofluoric acid, hydrosilicofluoric acid or ammonia.

9. A method according to claim 1, wherein the organic solvent is selected from the group consisting of alcohols, ethers, ketones and esters.

10. A method according to claim 1, wherein the mixing ratio of the aqueous catalyst solution and the organic solvent is 0.1–3.0 ml of the latter per 1 ml of the former.

11. A method according to claim 1, wherein the amount of the mixed solution of an aqueous catalyst solution and an organic solvent added to the concentrated sol solution is 3–25 ml per 100 ml of the concentrated sol solution.

12. A method according to claim 1, wherein the sintering is carried out at a temperature of from 1,150° C to a softening point or below.

* * * * *